United States Patent
Saito et al.

(10) Patent No.: US 8,908,328 B2
(45) Date of Patent: Dec. 9, 2014

(54) PERPENDICULAR MAGNETIC WRITE HEAD AND MAGNETIC RECORDING DEVICE HAVING ADDITIONAL MAGNETIC LAYER CONTACTING FRONT YOKE AND SHIELD

(71) Applicant: TDK Corporation, Tokyo (JP)

(72) Inventors: Masahiro Saito, Tokyo (JP); Norikazu Ota, Tokyo (JP); Hiromichi Umehara, Tokyo (JP); Masachika Hashino, Tokyo (JP)

(73) Assignee: TDK Corporation, Tokyo (JP)

( * ) Notice: Subject to any disclaimer, the term of this patent is extended or adjusted under 35 U.S.C. 154(b) by 78 days.

(21) Appl. No.: 13/644,903

(22) Filed: Oct. 4, 2012

(65) Prior Publication Data

US 2014/0098441 A1  Apr. 10, 2014

(51) Int. Cl.
  *G11B 5/31* (2006.01)
  *G11B 5/147* (2006.01)
  *G11B 5/127* (2006.01)

(52) U.S. Cl.
  CPC .............. *G11B 5/147* (2013.01); *G11B 5/1278* (2013.01); *G11B 5/3116* (2013.01)
  USPC ................................... 360/125.3; 360/125.25

(58) Field of Classification Search
  CPC .............................. G11B 5/1278; G11B 5/147
  USPC ............. 360/125.16, 125.21, 125.22, 125.23, 360/125.24, 125.25, 125.26, 125.27, 360/125.28, 125.29, 125.3
  See application file for complete search history.

(56) References Cited

U.S. PATENT DOCUMENTS

| | | | |
|---|---|---|---|
| 4,317,148 A * | 2/1982 | Chi | 360/125.22 |
| 7,019,944 B2 | 3/2006 | Matono et al. | |
| 2006/0082924 A1* | 4/2006 | Etoh et al. | 360/125 |
| 2010/0172054 A1* | 7/2010 | Yamaguchi et al. | 360/125.03 |

FOREIGN PATENT DOCUMENTS

| | | |
|---|---|---|
| JP | A-2004-039148 | 2/2004 |
| JP | A-2004-334975 | 11/2004 |

* cited by examiner

*Primary Examiner* — Craig A. Renner
(74) *Attorney, Agent, or Firm* — Oliff PLC

(57) ABSTRACT

A perpendicular magnetic write head includes: a magnetic pole having an end surface exposed on an air bearing surface, and extending in a height direction perpendicular to the air bearing surface; a first yoke having an end surface exposed on the air bearing surface, and facing a forward section of the magnetic pole with a gap layer in between; a second yoke located behind the first yoke with an insulating layer in between in the height direction, and connected to a backward section of the magnetic pole; a shield connecting the first yoke to the second yoke; and an additional magnetic layer located behind a boundary between the first yoke and the insulating layer, and in contact with the first yoke.

18 Claims, 16 Drawing Sheets

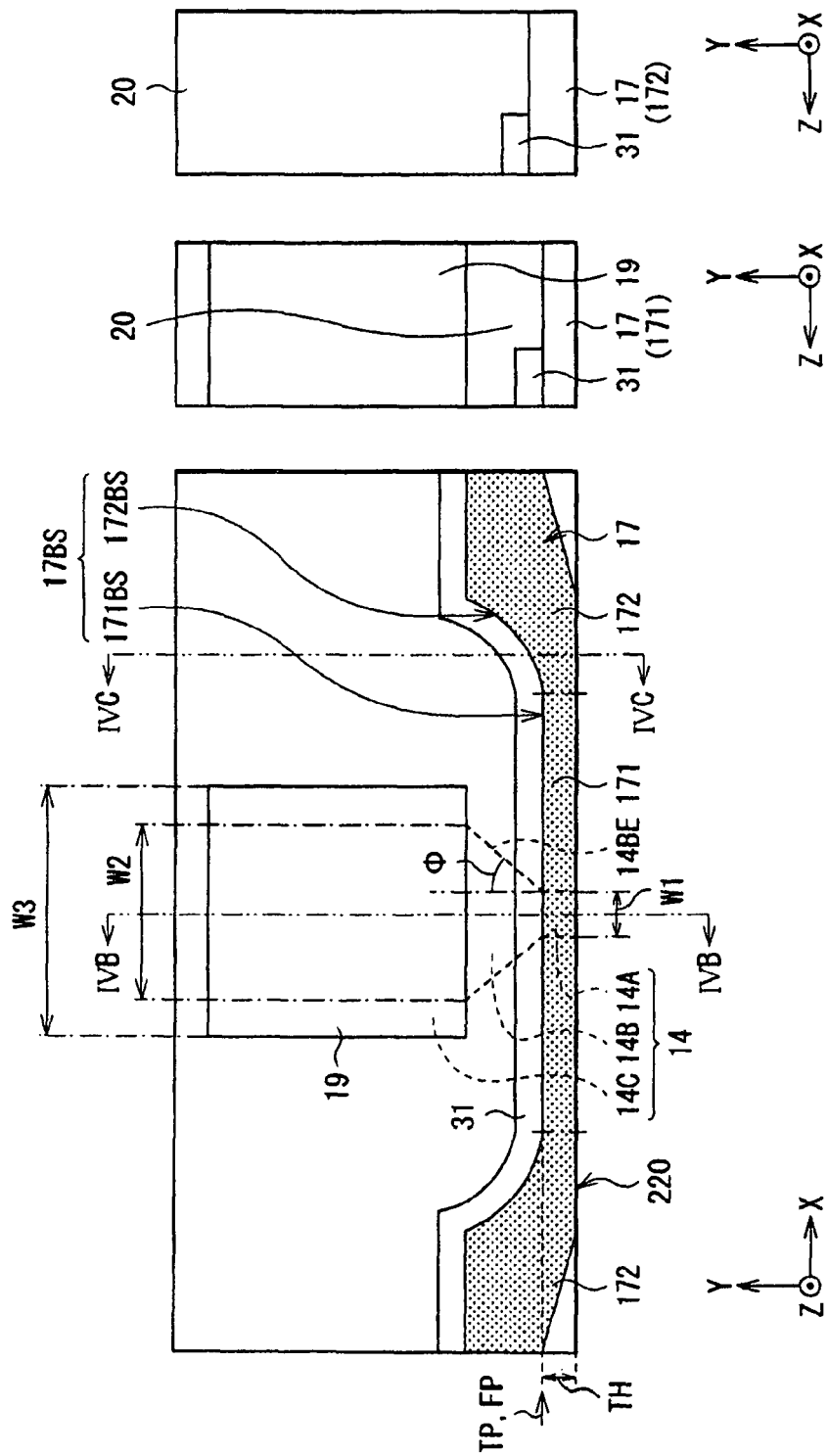

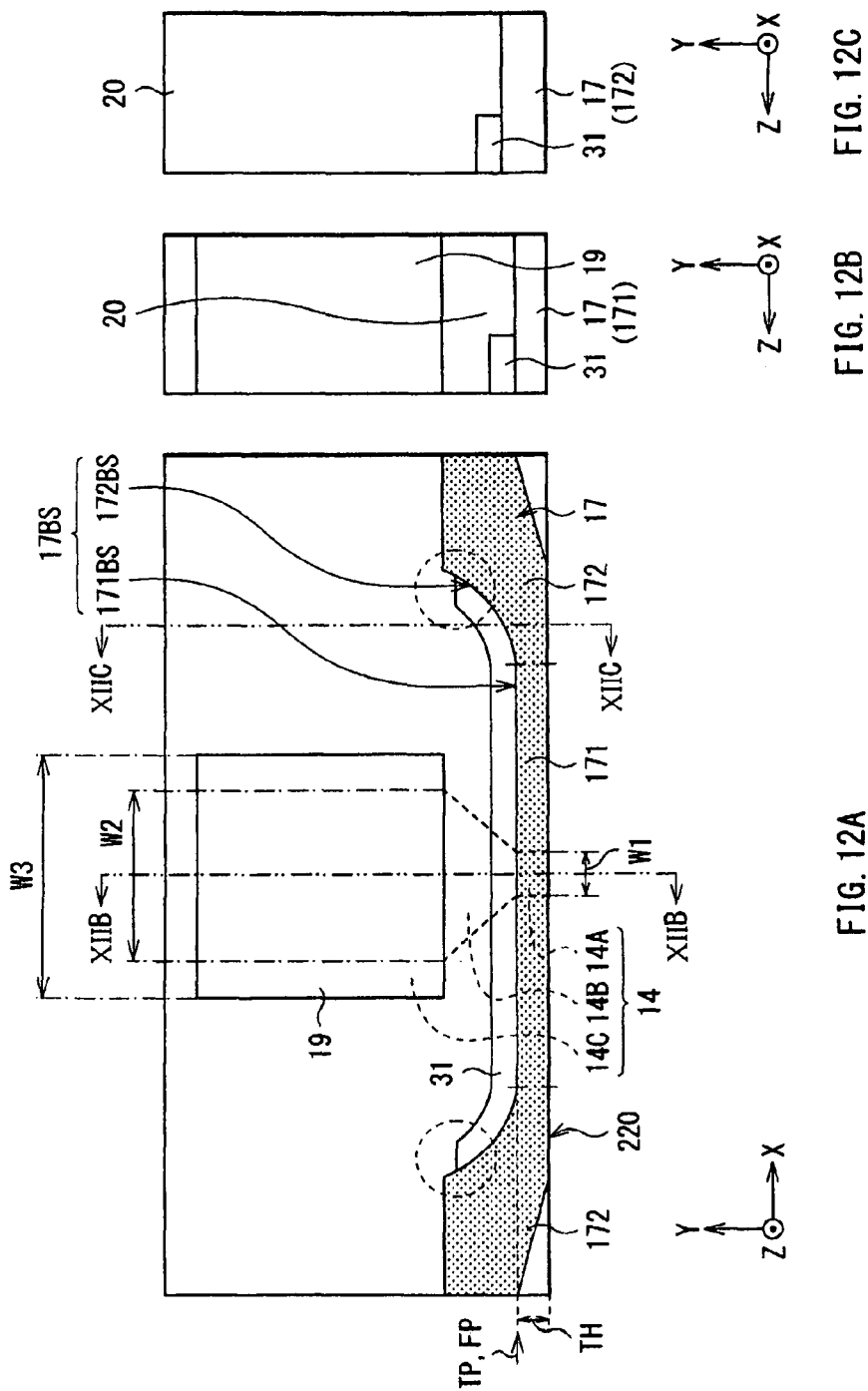

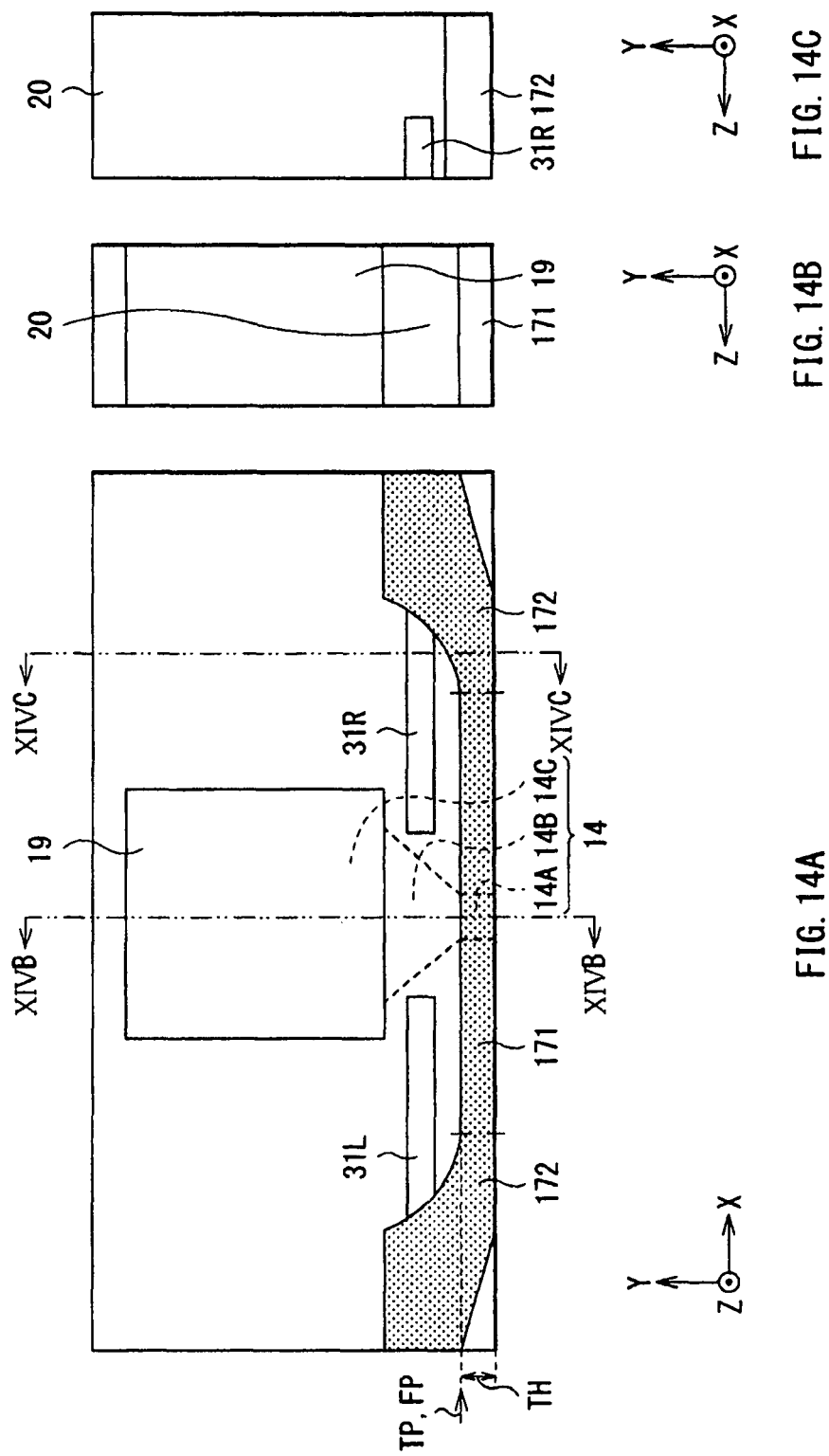

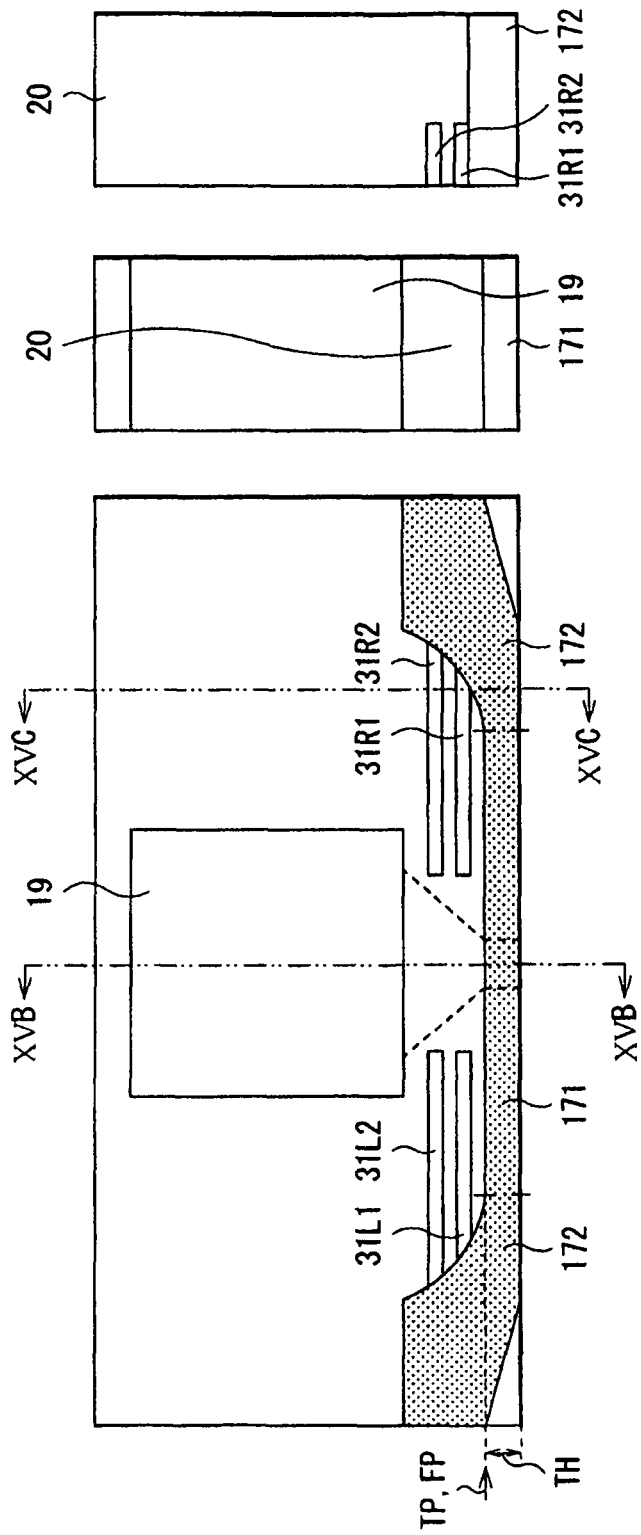

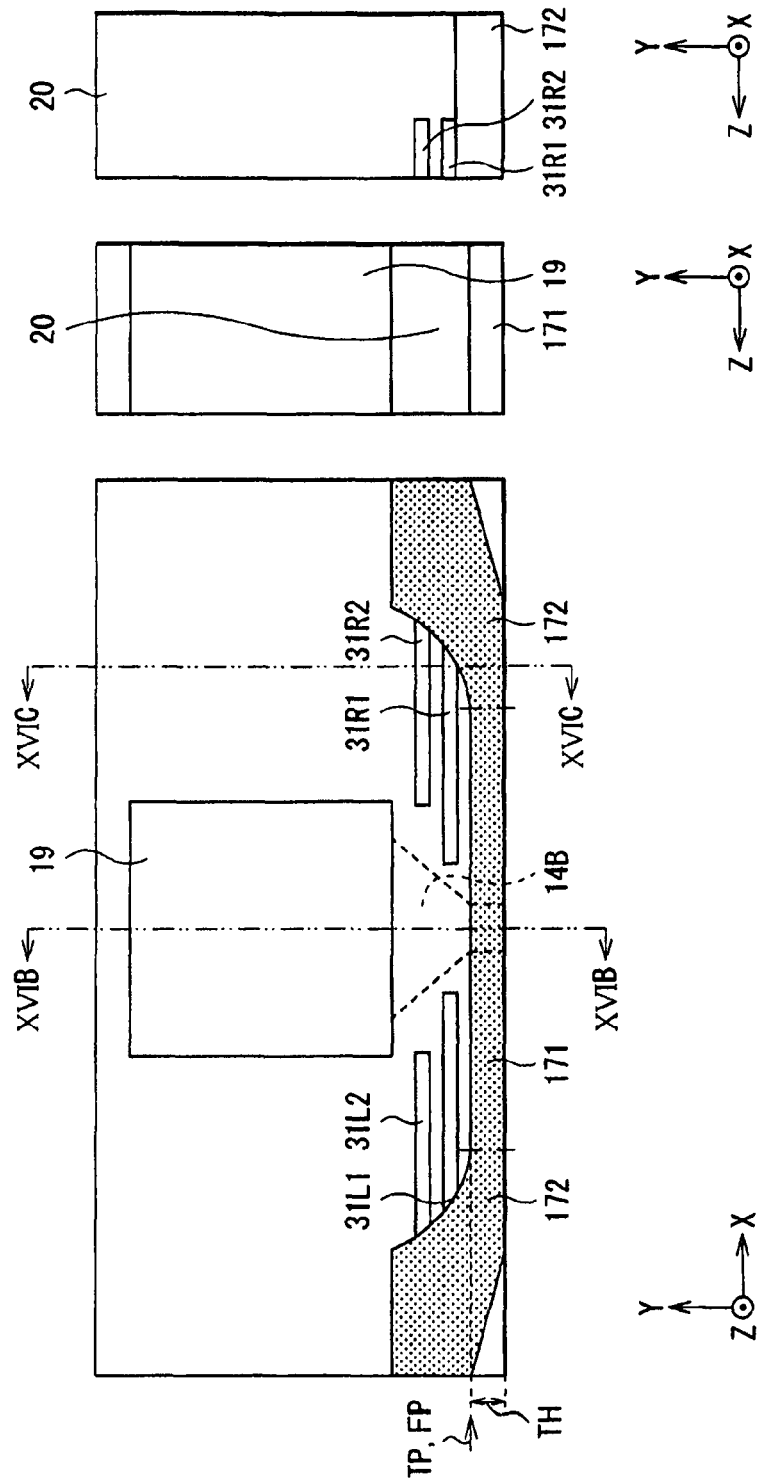

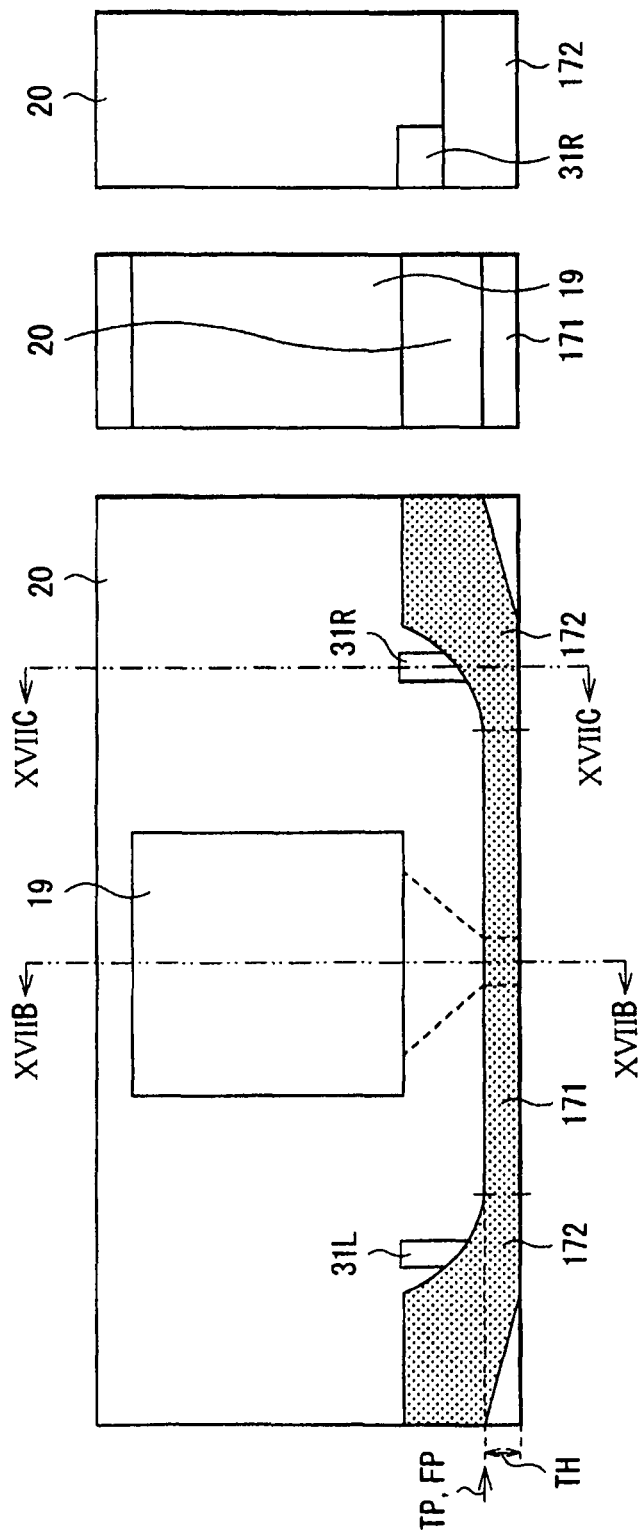
FIG. 17A
FIG. 17B
FIG. 17C

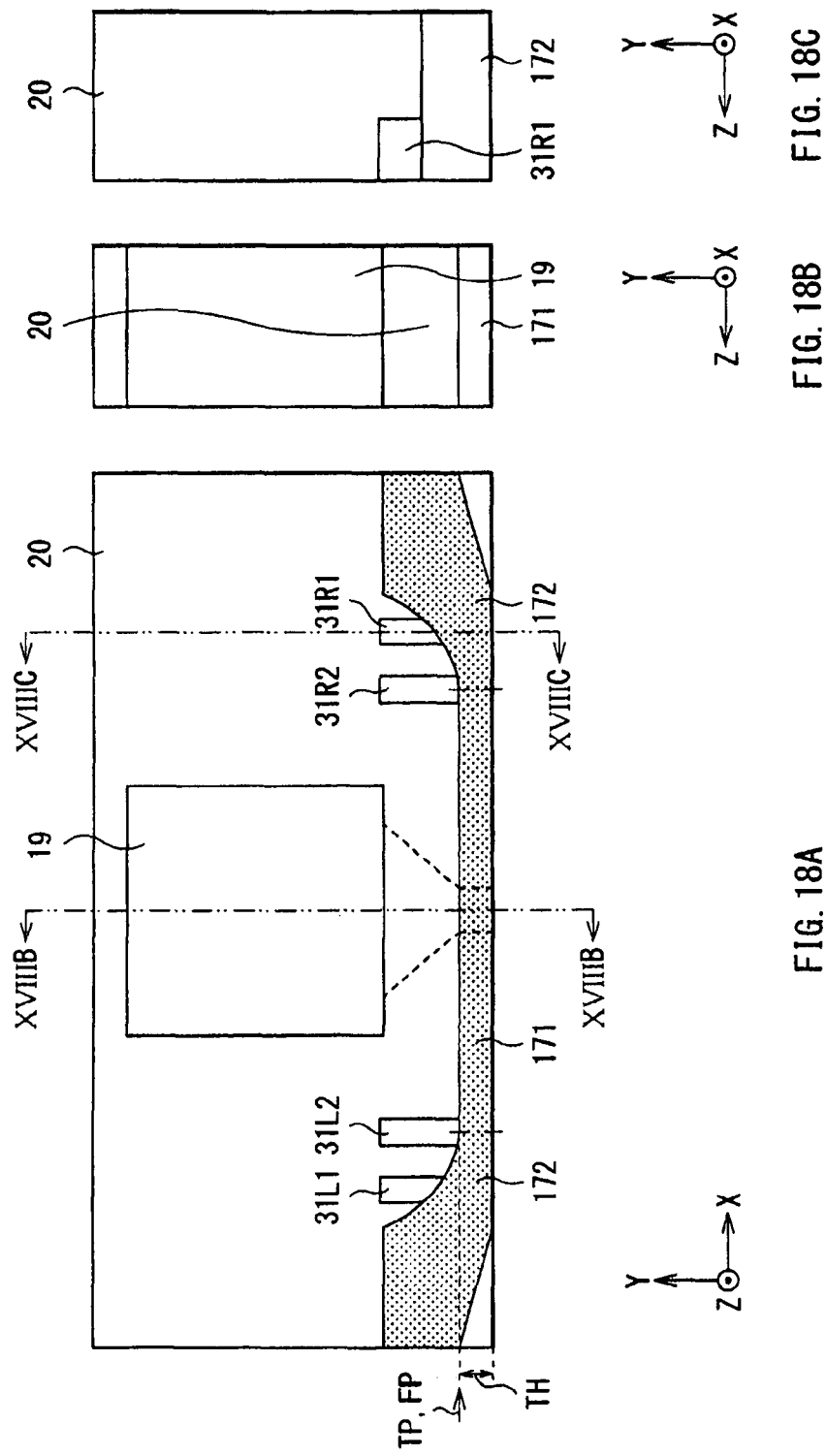

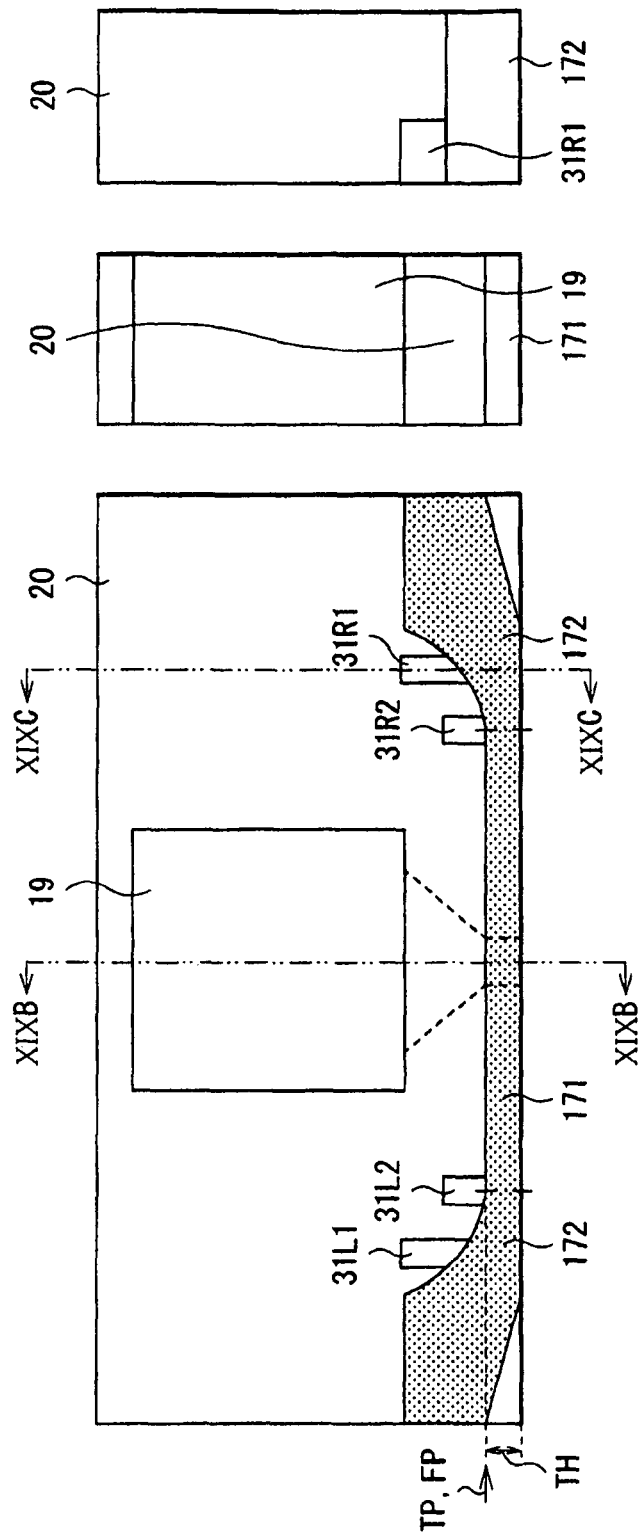
FIG. 19A
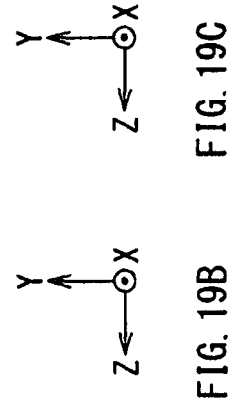
FIG. 19B
FIG. 19C

PERPENDICULAR MAGNETIC WRITE HEAD AND MAGNETIC RECORDING DEVICE HAVING ADDITIONAL MAGNETIC LAYER CONTACTING FRONT YOKE AND SHIELD

BACKGROUND OF THE INVENTION

1. Field of the Invention

The present invention relates to a perpendicular magnetic write head and to a magnetic recording device mounted with the same.

2. Description of Related Art

In recent years, along with an increased surface recording density in a magnetic recording medium (hereinafter, referred to as a "recording medium") typified by a hard disk, as a recording system of a magnetic write head, a perpendicular magnetic recording system in which a direction of signal magnetic field is set to a direction intersecting a surface of a recording medium is now the mainstream. This is because advantages that a track recording density is high compared with an existing longitudinal magnetic recording system and a recording medium in which information has been recorded is less likely to be affected by thermal fluctuation, are obtainable.

A magnetic write head in the perpendicular magnetic recording system (hereinafter, referred to as a "perpendicular magnetic write head") includes a main magnetic pole that guides magnetic flux generated in a thin film coil to a recording medium. The main magnetic pole includes a front end section (a magnetic pole) with a slightly small width. The front end section (the magnetic pole) of the main magnetic pole emits magnetic flux to generate magnetic field for recording (perpendicular magnetic field).

Most recently, there is a tendency that demand of improvement in the surface recording density of the magnetic recording medium is further increased. In such a circumstance, to obtain recording property of the perpendicular magnetic write head stably, for example, it is necessary to suppress wide adjacent track erase (WATE) effective magnetic field as much as possible. If the WATE effective magnetic field is not suppressed sufficiently, information recorded in tracks adjacent to a track to be written may be unintentionally overwritten with wrong information. The WATE effective magnetic field means effective magnetic field affecting adjacent tracks within a wide range (for example, two to ten tracks adjacent to a track to be written), out of recording magnetic field emitted from an air bearing surface toward the magnetic recording medium.

On the other hand, to address an increase in the surface recording density of the magnetic recording medium, improvement in high frequency property of the perpendicular magnetic write head is demanded.

However, in the existing perpendicular magnetic write head, shape of each of first and second yokes influences both the high frequency property and the WATE effective magnetic field. Here, a tradeoff relationship is established between improvement of the high frequency property and reduction of the WATE effective magnetic field, and thus it is difficult to achieve both demands.

Against this background, it is desirable to provide a perpendicular magnetic write head and a magnetic recording device that are capable of reducing the WATE effective magnetic field while ensuring favorable high frequency property, and thus addressing higher density recording.

SUMMARY OF THE INVENTION

A perpendicular magnetic write head as an embodiment of the present invention includes: a magnetic pole having an end surface exposed on an air bearing surface, and extending in a height direction perpendicular to the air bearing surface; a first yoke having an end surface exposed on the air bearing surface, and facing a forward section of the magnetic pole with a gap layer in between; a second yoke located behind the first yoke with an insulating layer in between in the height direction, and connected to a backward section of the magnetic pole; a shield connecting the first yoke to the second yoke; and an additional magnetic layer located behind a boundary between the first yoke and the insulating layer, and in contact with the first yoke. As used herein, the term "behind" refers to a direction away from the air bearing surface.

A magnetic recording device as an embodiment of the present invention includes a magnetic recording medium and the perpendicular magnetic write head described above.

In the perpendicular magnetic write head and the magnetic recording device as the embodiments of the present invention, the additional magnetic layer located behind the boundary between the first yoke and the insulating layer is provided. Therefore, out of magnetic flux emitted from the magnetic pole toward the magnetic recording medium, leakage magnetic flux unnecessary for writing is absorbed by the additional magnetic layer. In other words, providing the additional magnetic layer enables reduction of the WATE effective magnetic field, irrespective of the shapes of the first yoke and the second yoke. Therefore, according to the perpendicular magnetic write head and the magnetic recording device of the embodiments, the additional magnetic layer enables reduction of the WATE effective magnetic field while appropriate shapes of the first and second yokes enable improvement in the high frequency property. As a result, it is be possible to address higher density recording.

BRIEF DESCRIPTION OF THE DRAWINGS

FIG. 4A is a plan view illustrating a structure of the main part of the thin film magnetic head illustrated in FIG. 2.

FIGS. 4B and 4C are sectional diagrams each illustrating a structure of the main part of the thin film magnetic head illustrated in FIG. 2.

FIGS. 12A to 12C are a plan view and sectional diagrams for explaining a first modification related to a structure of a thin film magnetic head.

FIGS. 14A to 14C are a plan view and sectional diagrams for explaining a third modification related to a structure of a thin film magnetic head.

FIGS. 15A to 15C are a plan view and sectional diagrams for explaining a fourth modification related to a structure of a thin film magnetic head.

FIGS. 16A to 16C are a plan view and sectional diagrams for explaining a fifth modification related to a structure of a thin film magnetic head.

FIGS. 17A to 17C are a plan view and sectional diagrams for explaining a sixth modification related to a structure of a thin film magnetic head.

FIGS. 18A to 18C are a plan view and sectional diagrams for explaining a seventh modification related to a structure of a thin film magnetic head.

FIGS. 19A to 19C are a plan view and sectional diagrams for explaining an eighth modification related to a structure of a thin film magnetic head.

DETAILED DESCRIPTION OF THE PREFERRED EMBODIMENTS

Hereinafter, an embodiment of the present invention will be described in detail with reference to accompanying drawings.

[Configuration of Magnetic Recording-Reproducing Device]

Figure 1:
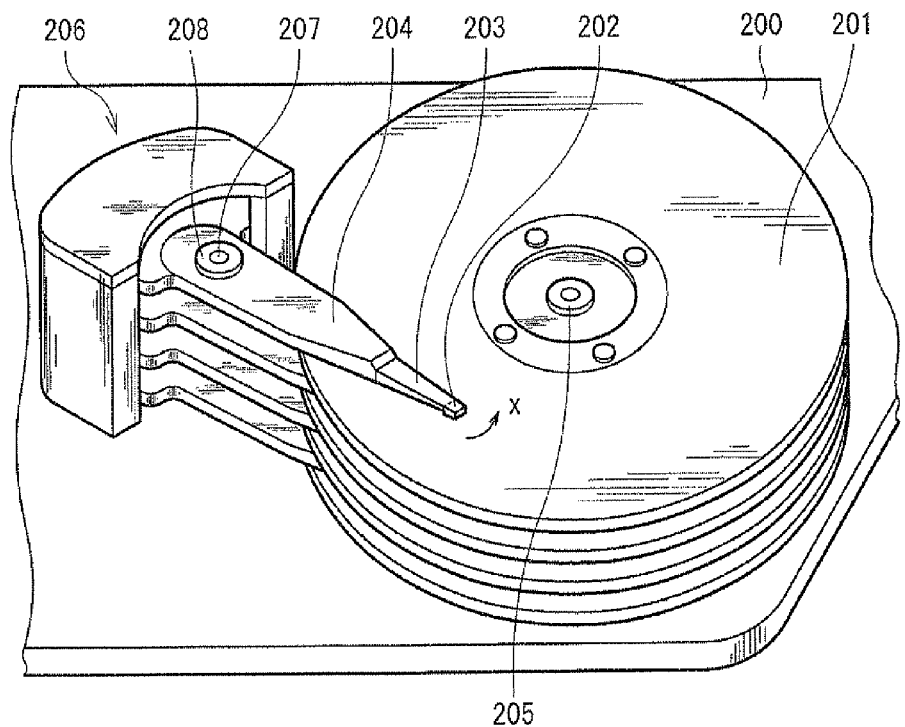
FIG. 1 is a perspective view illustrating a configuration of a magnetic recording-reproducing device according to an embodiment of the invention.
Figure 2:
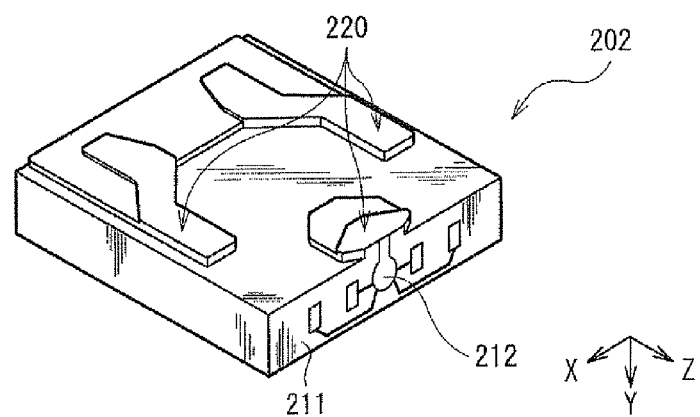
FIG. 2 is a perspective view illustrating a configuration of a main part of FIG. 1 in an enlarged manner.

With reference to FIG. 1 and FIG. 2, a configuration of a magnetic recording-reproducing device mounted with a thin film magnetic head is described. FIG. 1 illustrates a perspective configuration of an entire magnetic recording-reproducing device, and FIG. 2 illustrates a perspective configuration of a main part of the magnetic recording-reproducing device.

The magnetic recording-reproducing device is, for example, a hard disk drive, and includes, inside of a housing 200, a plurality of magnetic disks (hard disks) 201 as magnetic recording media, a plurality of suspensions 203 that is disposed to correspond to the magnetic disks 201 and each has one end supporting a magnetic head slider 202, and a plurality of arms 204 each supporting the other end of each of the suspensions 203, as illustrated in FIG. 1. The magnetic disk 201 is rotatable around a spindle motor 205 fixed to the housing 200. The arm 204 is connected to a drive section 206 serving as a power source, and is pivotable around a fixed shaft 207 fixed to the housing 200 through a bearing 208. The drive section 206 includes a drive source such as a voice coil motor. The magnetic recording device is, for example, a model in which the plurality of arms 204 is integrally pivotable around the fixed shaft 207. Incidentally, in FIG. 1, the housing 200 is partially cut out to facilitate visualization of an inner structure of the magnetic recording device.

In addition, although four magnetic disks 201 are illustrated in FIG. 1, the number of the magnetic disks 201 is not specifically limited and may be one. The detailed configuration of the magnetic disk 201 will be described later.

As illustrated in FIG. 2, for example, the magnetic head slider 202 is a type that is configured by mounting a thin film magnetic head 212 as the above-described thin film magnetic head on one surface of a base material 211. The base material 211 has a substantially rectangular parallelepiped structure configured of a non-magnetic insulating material such as AlTiC ($Al_2O_3.TiC$). For example, a concavo-convex structure to reduce air resistance generated at the time when the arm 204 pivots is provided on one surface (the air bearing surface 220) of the base material 211. The thin film magnetic head 212 is attached to the other surface (a surface on a front right side in FIG. 2) orthogorial to the air bearing surface 220. When the magnetic disk 201 rotates at the time of recording or reproducing information, the magnetic head slider 202 floats above a recording surface (a surface facing the magnetic head slider 202) of the magnetic disk 201 by using air flow generated between the recording surface of the magnetic disk 201 and the air bearing surface 220. Note that, in FIG. 2, the magnetic head slider 202 upside down from the state of FIG. 1 is illustrated to facilitate visualization of the configuration on the air bearing surface 220 side of the magnetic head slider 202.

In the magnetic recording-reproducing device, when the arm 204 pivots at the time of recording or reproducing information, the magnetic head slider 202 moves to a predetermined recording region on the magnetic disk 201. Then, when power is applied to the thin film magnetic head 212 in a state where that faces the magnetic disk 201, recording processing or reproducing processing is performed on the magnetic disk 201 by the thin film magnetic head 212 based on the above-described operation principle.

[Configuration of Thin Film Magnetic Head]

FIGS. 3A and 3B, FIGS. 4A to 4C, and FIG. 5 each illustrate a structure example of the thin film magnetic head 212 that includes a perpendicular magnetic write head mounted on the above-described magnetic recording device.

Figures 3A, 3B:
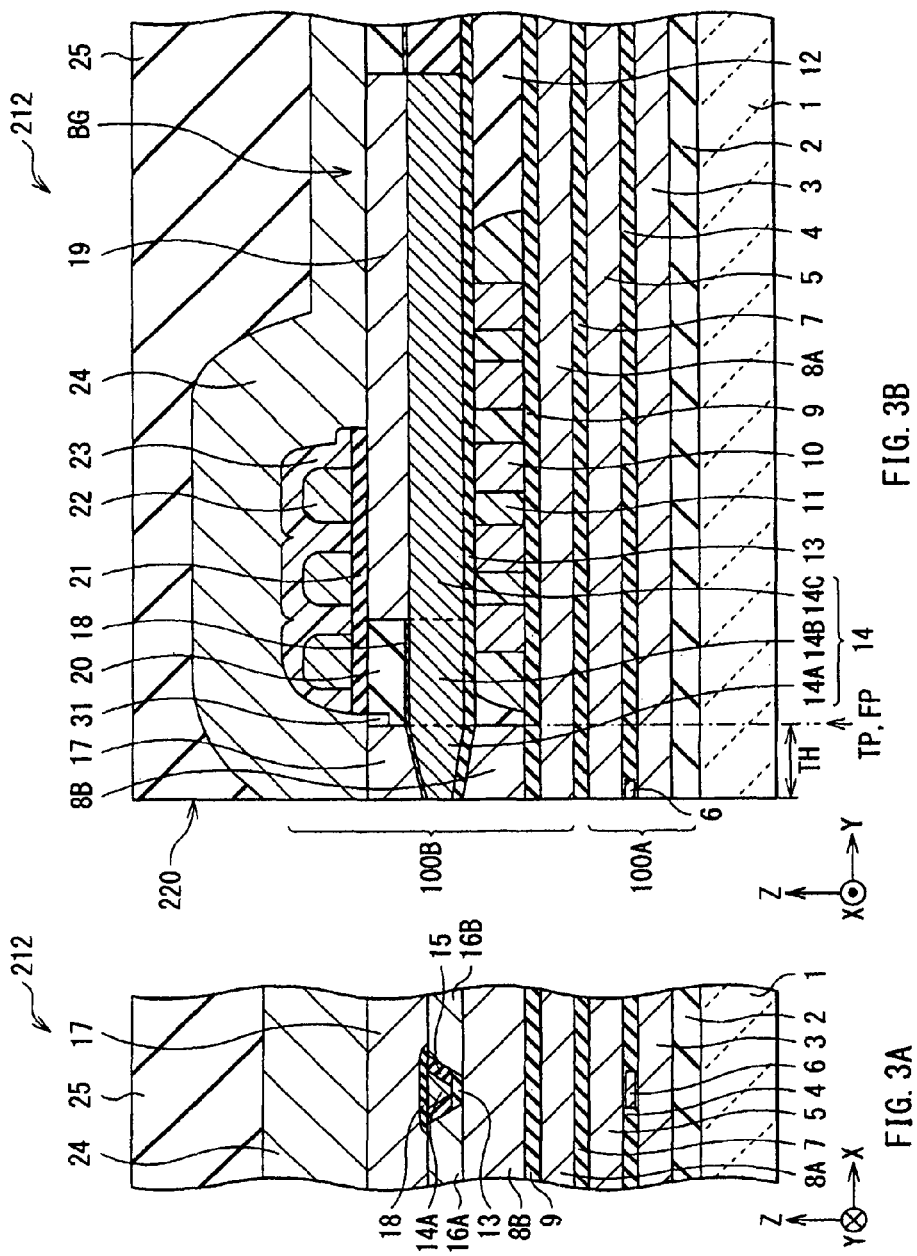
FIGS. 3A and 3B are sectional diagrams each illustrating a structure of a thin film magnetic head illustrated in FIG. 2.

FIGS. 3A and 3B each illustrate a cross-sectional structure of the entire thin film magnetic head 212. In detail, FIG. 3A illustrates a cross section (an XZ cross section) parallel to the air bearing surface 220, and FIG. 3B illustrates a cross section (an YZ cross section) orthogonal to the air bearing surface 220. FIG. 4A illustrates a planar structure of a main part. FIGS. 4B and 4C illustrate a cross-sectional structure taken along a IVB-IVB cut line and a IVC-IVC cut line in FIG. 4A, respectively. In addition, FIG. 5 is a diagram for explaining a relationship between the thin film magnetic head 212 and the magnetic disk 201.

Figure 5:
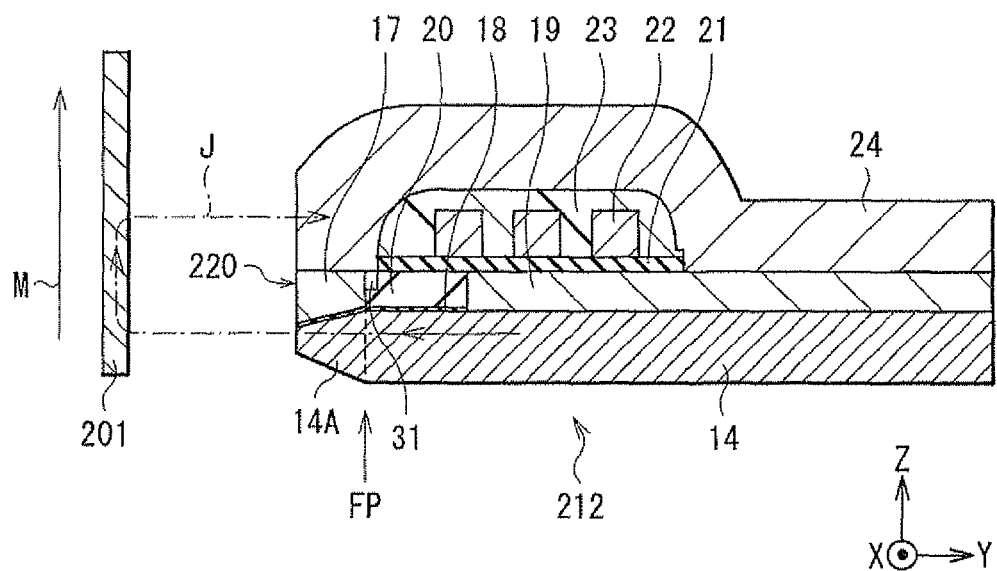
FIG. 5 is a sectional diagram for explaining a relationship between the thin film magnetic head illustrated in FIG. 2 and a magnetic disk.
Figure 6:
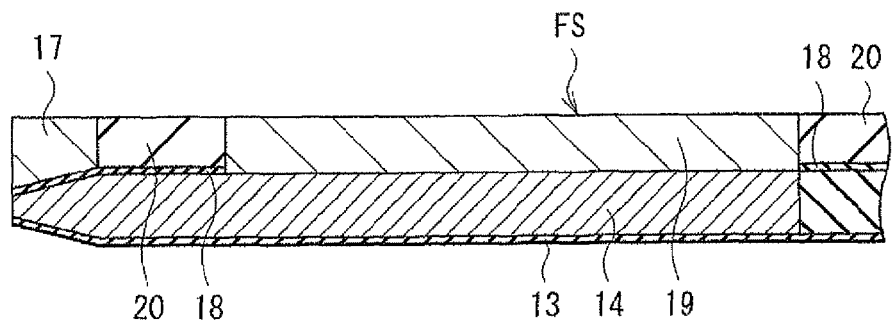
FIG. 6 is a sectional diagram for explaining a manufacturing process of the main part of the thin film magnetic head.

Note that an up-arrow M illustrated in FIG. 5 indicates a direction in which the magnetic disk 201 relatively moves with respect to the thin film magnetic head 212.

In the following description, dimensions in the X-axis direction, Y-axis direction, and the Z-axis direction are referred to as a "width", a "height", and a "thickness", respectively, and a closer side and a farther side to/from the air bearing surface 220 in the Y-axis direction are referred to as "forward" and "backward", respectively. Moreover, frontward and rearward in the direction of the arrow M are referred to as a "trailing side" and a "leading side", respectively, and the X-axis direction and the Z-axis direction are referred to as a "cross track direction" and a "down track direction", respectively.

The thin film magnetic head 212 performs magnetic process to the magnetic disk 201, and is, for example, a composite head capable of performing both of the reproducing processing and the recording processing.

As illustrated in FIGS. 3A and 3B, for example, the thin film magnetic head 212 is configured by stacking an insulating layer 2, a read head section 100A, a separation layer 7, a write head section 100B, and an overcoat 25 in this order on a substrate 1. The thin film magnetic head 212 has the air bearing surface 220 as a side surface common to these layers and sections.

The insulating layer 2, the separation layer 7, and the overcoat 25 are each formed of a non-magnetic insulating material such as aluminum oxide. Examples of the aluminum oxide include alumina ($Al_2O_3$).

The read head section 100A uses magneto-resistive effect (MR) to perform the reproducing processing. The read head section 100A is configured by stacking, for example, a lower lead shield 3, a shield gap 4, and an upper lead shield 5 in this order. A read element (an MR element 6) is so embedded in the shield gap 4 as to allow one end surface of the read element to be exposed on the air bearing surface 220.

The lower lead shield 3 and the upper lead shield 5 magnetically separate the MR element 6 from its surroundings, and extend backward from the air bearing surface 220. The lower lead shield 3 is formed of, for example, a magnetic material such as nickel iron alloy (NiFe). For example, nickel iron alloy may be Permalloy (trade name), or others in which the content of nickel is 80 wt % and the content of iron is 20 wt %. The upper lead shield 5 is formed of, for example, a magnetic material such as Permalloy. Incidentally, the lower lead shield 3 and the upper lead shield 5 may have a single-layer structure, or may have a multi-layer structure in which, for example, a pair of magnetic layers (formed of a magnetic material such as Permalloy) is disposed on both sides of a non-magnetic layer (formed of, for example, a non-magnetic conductive material such as ruthenium (Ru) or a non-magnetic insulating material such as alumina).

The shield gap 4 electrically separates the MR element 6 from its surroundings, and is formed of, for example, a non-magnetic insulating material such as alumina. The MR element 6 uses giant magneto-resistive effect (GMR), tunneling magneto-resistive effect (TMR), or the like to perform the reproducing processing.

The write head section 100B is a perpendicular magnetic write head performing recording processing of a perpendicular magnetic recording system. The write head section 100B is configured by stacking, on the separation layer 7, for example, a magnetic layer 8A, an insulating layer 9, a thin film coil 10 embedded in insulating layers 11 to 13, a leading shield 8B having an end surface exposed on the air bearing surface 220, a main magnetic pole 14, a side gap 15 and a pair of side shields 16A and 16B, a pedestal yoke 17, a trailing gap 18, a top yoke 19, an insulating layer 20, a thin film coil 22 embedded in insulating layers 21 and 23, and a write shield 24 in this order. An additional magnetic layer 31, at least a part of which is in contact with the pedestal yoke 17, is embedded in the insulating layer 20.

The magnetic layer 8A functions as a return path on a leading side, and is formed of, for example, a magnetic material such as NiFe and CoNiFe. The magnetic layer 8A disperses part of recording magnetic field emitted from the main magnetic pole 14 to the leading side so that wide adjacent track erase (WATE) effective magnetic field is reduced. The WATE effective magnetic field means effective magnetic field affecting adjacent tracks within a wide range (for example, two to ten tracks adjacent to a track to be written), as described above.

The thin film coil 10 generates leakage-suppression magnetic flux mainly to suppress unintentional reaching (leakage) of recording-use magnetic flux, which is generated by the thin film coil 22, to the read head section 100A. The thin film coil 10 is formed of, for example, a high conductive material such as copper (Cu), and has a structure (a spiral structure) winding around a back gap BG.

The insulating layers 11 to 13 electrically separate the thin film coil 10 from its surroundings. The insulating layer 11 is formed of, for example, a non-magnetic insulating material such as photoresist flowing at heating or spin on glass (SOG). The insulating layers 12 and 13 are each formed of, for example, a non-magnetic insulating material such as alumina.

The main magnetic pole 14 takes therein magnetic flux generated by the thin film coil 22, and emits the magnetic flux from the air bearing surface 220 to generate recording magnetic field. The main magnetic pole 14 extends backward from the air bearing surface 220, and is formed of, for example, a magnetic material with high saturation flux density such as iron-based alloy. Examples of the iron-based alloy include iron cobalt alloy (FeCo) and iron cobalt nickel alloy (FeCoNi).

As illustrated in FIG. 4A, for example, the main magnetic pole 14 has an integrated structure in which a front end section 14A having a uniform width W1 (a first width) defining a write track width, a mid-section 14B having a width that increases from the width W1 up to a width W2 larger than the width W1 (a second width; W2>W1), and a rear end section 14C having a width W3 larger than the width W2 (a third width; W3>W2) are connected in this order backward from the air bearing surface 220. The rear end section 14C has the same shape as that of the top yoke 19, for example. A position where the width of the main magnetic pole 14 starts to increase from the front end section 14A to the mid-section 14B, namely, a position where the width of the main magnetic pole 14 starts to increase from the width W1 defining the write track width is a flare point FP that is one of important factors determining recording performance of the thin film magnetic head.

The front end section 14A is a section substantially emitting recording-use magnetic flux, which is generated by the thin film coil 22, toward the magnetic disk 201, and is so extended in the Y-axis direction as to have the uniform width W1 over the entire section.

The mid-section 14B is a section supplying magnetic flux taken in the top yoke 19 to the front end section 14A. The width of the mid-section 14B gradually increases from the width W1 to the width W2, namely, the mid-section 14B has the width W1 at a part connected with the front end section 14A, and has the width W2 at a part connected with the rear end section 14C. The expansion angle in the mid-section 14B, that is, an angle $\Phi$ between an extending direction (the Y-axis direction) of the front end section 14A and a side end 14BE of the mid-section 14B is equal to or larger than 30 degrees, and is preferably within a range of about 40 degrees to about 50 degrees.

The rear end section 14C is a section supplying magnetic flux taken in the top yoke 19 to the front end section 14A, similarly to the mid-section 14B. The rear end section 14C is so extended in the Y-axis direction as to have the uniform width W3 over the entire section.

The thickness of the main magnetic pole 14 may be uniform over all or may be partially varied. Here, for example, the thickness of the front end section 14A gradually decreases with decrease in distance from the air bearing surface 220, as compared with the uniform thickness of the mid-section 14B and the rear end section 14C. Here, both of the surfaces on the trailing side and on the leading side of the front end section 14A are inclined.

The main magnetic pole 14 is surrounded by the insulating layer 13, the side gap (SG) 15, and the trailing gap 18, and is mutually separated and magnetically shielded from the leading shield 8B, the side shields 16A and 16B, and the pedestal yoke 17.

The side gap 15 magnetically separates the main magnetic pole 14 from the pair of side shields 16A and 16B in the width direction (recording-track width direction=the X-axis direction). The side gap 15 is provided between the main magnetic pole 14 and the pair of side shields 16A and 16B, and is adjacent to both sides in the width direction of the main magnetic pole 14 (hereinafter, simply referred to as "both sides").

The trailing gap 18 magnetically separates the main magnetic pole 14 from the pedestal yoke 17 in a thickness direction (a direction intersecting with the recording-track width direction=the Y-axis direction), and is also called a write gap. The trailing gap 18 is provided between the main magnetic pole 14 and the pedestal yoke 17. Note that the side gap 15 and the trailing gap 18 are each formed of, for example, a non-magnetic material such as alumina.

The leading shield 8B, the pedestal yoke 17, and the side shields 16A and 16B mainly take in magnetic flux in the vicinity of the air bearing surface 220 to prevent that magnetic flux from spreading. As a result, the gradient of the recording magnetic field is increased, the recording track width is narrowed, and the magnetic field component in an oblique direction is accordingly generated in the recording magnetic field. The leading shield 8B, the pedestal yoke 17, and the side shields 16A and 16B extend backward from the air bearing surface 220, and are terminated at the flare point FP, for example. Accordingly, the pedestal yoke 17 and the side shields 16A and 16B are adjacent to the insulating layer 20 on the rear side, and play a role to define the front-most end position (throat height zero position TP) of the insulating layer 20. The leading shield 8B, the pedestal yoke 17, and the side shields 16A and 16B are each formed of, for example, a magnetic material similar to that of the main magnetic pole 14, and have a rectangular planar shape with the uniform width W3 larger than the width W2, as illustrated in FIG. 4A.

The pedestal yoke 17 has an end surface exposed on the air bearing surface 220, and has a midsection 171 extending in the width direction, and a pair of wing sections 172 that is connected to both ends of the midsection 171, respectively, and is curved in a direction away from the air bearing surface 220 (+Y direction).

The insulating layer 20 is provided behind the pedestal yoke 17. The insulating layer 20 defines a throat height TH that is one of important factors determining recording property of the thin film magnetic head, and is provided between the top yoke 19 and the pedestal yoke 17 as well as the side shields 16A and 16B. The front-most end position of the insulating layer 20 is the throat height zero position TP as described above, and the distance between the throat height zero position TP and the air bearing surface 220 is the throat height TH. The insulating layer 20 is formed of, for example, a non-magnetic insulating material such as alumina. Note that in FIG. 3B and FIG 4A, for example, a case where the throat height zero position TP is coincident with the flare point FP is illustrated.

The additional magnetic layer 31 located behind the pedestal yoke 17 is embedded in the insulating layer 20.

The additional magnetic layer 31 is located behind a boundary between the pedestal yoke 17 and the insulating layer 20, namely, behind the throat height zero position TP, and a part thereof is in contact with the pedestal yoke 17. The additional magnetic layer 31 is formed of, for example, the same material as that of the pedestal yoke 17 or the write shield 24, and is to take in unnecessary magnetic flux and to prevent spread of the magnetic flux of the recording magnetic field toward the magnetic disk 201 from the main magnetic pole 14, at the time of writing operation. Providing the additional magnetic layer 31 at a location behind the throat height zero position TP enables effective absorption of unnecessary magnetic flux, thereby sufficiently reducing the WATE effective magnetic field.

Incidentally, when (at least a part of) the additional magnetic layer 31 is located in front of the boundary between the pedestal yoke 17 and the insulating layer 20 (that is, the current throat height zero position TP), the position of the throat height zero position TP is changed. For example, the boundary between the additional magnetic layer 31 and the insulating layer 20 becomes the throat height zero position TP consequently.

In the embodiment, the additional magnetic layer 31 is provided along a rear end surface 17BS of the pedestal yoke 17, more specifically, is continuously provided along a rear end surface 171BS of the midsection 171 and a rear end surface 172BS of the pair of wing sections 172. In other words, the additional magnetic layer 31 extends across the front end section 14A of the main magnetic pole 14 in the width direction.

Note that it is good enough for the additional magnetic layer 31 to be located behind the boundary between the pedestal yoke 17 and the insulating layer 20, that is, located behind the throat height zero position TP and to be at least partially in contact with the pedestal yoke 17, without being limited to the example illustrated in FIGS. 4A to 4C. In addition, although an upper end of the additional magnetic layer 31 is in contact with the write shield 24, a lower end of the additional magnetic layer 31 is not in contact with the trailing gap 18. Therefore, the thickness of the additional magnetic layer 31 is smaller than the thickness of the pedestal yoke 17, for example, is about 50% of the thickness of the pedestal yoke 17, and preferably, is 10% or more and 25% or less of the thickness of the pedestal yoke 17. In addition, the additional magnetic layer 31 may be integrated with the write shield 24.

The top yoke 19 functions as an auxiliary magnetic-flux taking part for supplying magnetic flux to the main magnetic pole 14, and for example, may be formed of a magnetic material similar to that of the main magnetic pole 14, or may be formed of a different magnetic material. The top yoke 19 extends backward from a position recessed from the air bearing surface 220 on the trailing side of the main magnetic pole 14, and a lower surface of the top yoke 19 is connected with the main magnetic pole 14. The top yoke 19 has a rectangular planar shape with the width W3, for example, as illustrated in FIG. 4A.

The thin film coil 22 generates recording-use magnetic flux, and in the thin film coil 22, current flows in a direction opposite to that of the thin film coil 10, for example. Incidentally, the detailed structure of the thin film coil 22 is similar to that of the thin film coil 10, for example. In addition, instead of the thin film coils 10 and 22 with a spiral structure winding in the stacking plane as described above, a helical coil with a structure winding around the main magnetic pole 14 and the top yoke 19 in the Y-axis direction may be employed.

The insulating layers 21 and 23 electrically separate the thin film coil 22 from its surroundings, and are connected with the insulating layer 20. The insulating layer 21 is formed of, for example, a non-magnetic insulating material similar to that of the insulating layers 12 and 13, and the insulating layer 23 is formed of, for example, a non-magnetic insulating material similar to that of the insulating layer 11. The front-most end of each of the insulating layers 21 and 23 is recessed from the front-most end of the insulating layer 20, for example.

The write shield 24 mainly takes in magnetic flux returning from the magnetic disk 201 to the write head section 100B, and circulates the magnetic flux therebetween. The circulation function for this magnetic flux is provided by not only the write shield 24 but also the side shields 16A and 16B and the pedestal yoke 17, in some cases. The write shield 24 is positioned on the trailing side of the side shields 16A and 16B, the pedestal yoke 17, and the top yoke 19, and extends backward from the air bearing surface 220 as a starting point. The write shield 24 is connected with the pedestal yoke 17 and the additional magnetic layer 31 on the front side thereof, and is connected with the top yoke 19 and the back gap BG on the rear side thereof. In addition, the write shield 24 is, for example, formed of a magnetic material similar to that of the main magnetic pole 14, and has a rectangular planar shape with a width larger than the width W3. Note that the write shield 24 may be formed of a magnetic material different from that of the main magnetic pole 14.

[Method of Manufacturing Thin Film Magnetic Head]

Next, an example of a method of manufacturing the thin film magnetic head 212 is described with reference to FIG. 6 to FIG. 11, in addition to FIGS. 3A and 3B. FIG. 6 to FIG. 11 are sectional diagrams for explaining formation processes of a main part of the thin film magnetic head 212, and correspond to a part of FIG. 3B. The details of materials, dimensions, and shapes of a series of components which have been already described will be appropriately omitted in the following description about the method of manufacturing the thin film magnetic head 212.

The thin film magnetic head 212 is mainly manufactured by sequentially forming and stacking a series of components using an existing thin film process. The existing thin film process is, for example, film formation techniques such as electrolytic plating and sputtering, patterning techniques such as photolithography, etching techniques such as dry etching and wet etching, and polishing techniques such as chemical mechanical polishing (CMP).

First, as illustrated in FIGS. 3A and 3B, the insulating layer 2 is first formed on the substrate 1. Subsequently, the lower lead shield 3, the shield gap 4 embedded with the MR element 6, and the upper lead shield 5 are stacked and formed in this order on the insulating layer 2 to form the read head section 100A. Then, the separation layer 7 is formed on the read head section 100A.

Subsequently, the magnetic layer 8A, the insulating layer 9, and the thin film coil 10 embedded by the insulating layers 11 and 12 are formed in order on the separation layer 7. Next, the leading shield 8B is provided in front of the thin film coil 10. Further, the insulating layer 13 is so formed as to cover the insulating layers 9, 11, and 12, the leading shield 8B, and the thin film coil 10, and the main magnetic pole 14 is then formed. After that, the side gap 15 and the trailing gap 18 are formed, and the side shields 16A and 16B, the pedestal yoke 17, and the top yoke 19 are formed. In addition, the insulating layer 20 is so formed as to fill a gap between the pedestal yoke 17 and the top yoke 19 and a gap around the top yoke 19. Then, the surfaces of the pedestal yoke 17, the top yoke 19, and the insulating layer 20 are flattened by the CMP or the like to obtain a flattened surface FS (see FIG. 6).

Figure 7:
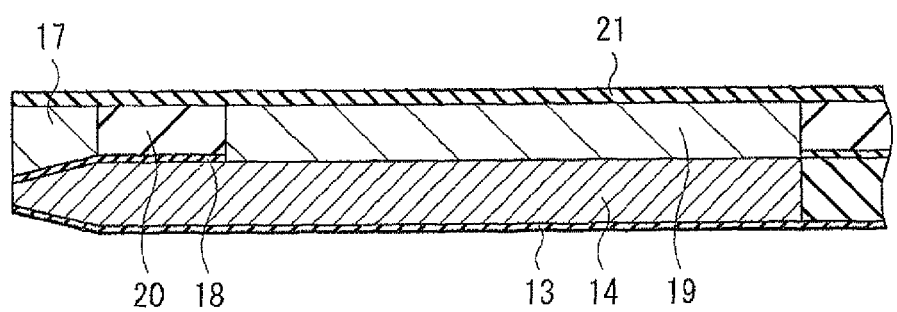
FIG. 7 is a sectional diagram for explaining a process following the process of FIG. 6.
Figure 8:
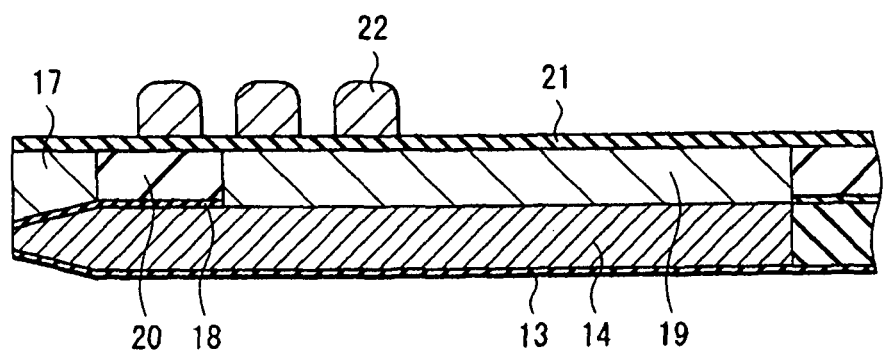
FIG. 8 is a sectional diagram for explaining a process following the process of FIG. 7.

After that, as illustrated in FIG. 7, the insulating layer 21 is so formed as to cover the entire flattened surface FS. Further, a resist mask (not illustrated) having a predetermined pattern is formed on the insulating layer 21 by photolithography or the like, and then the thin film coil 22 is formed, for example, by plating with use of the resist mask (see FIG. 8).

Figure 9:
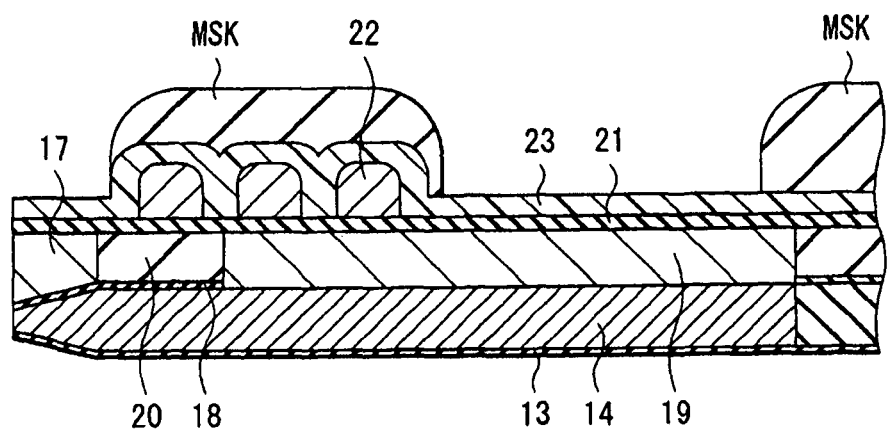
FIG. 9 is a sectional diagram for explaining a process following the process of FIG. 8.

Subsequently, as illustrated in FIG. 9, the insulating layer 23 is so formed as to cover the entire part, and then a mask MSK is so selectively formed as to cover a partial region on the insulating layer 23.

Figure 10:
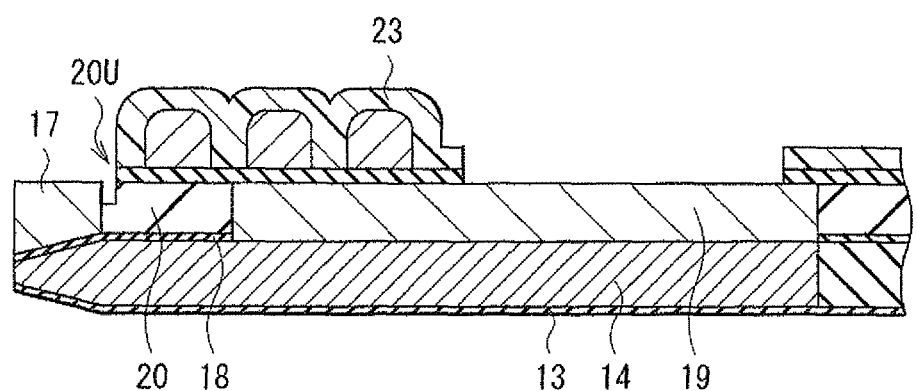
FIG. 10 is a sectional diagram for explaining a process following the process of FIG. 9.

After that, as illustrated in FIG. 10, exposed parts of the insulating layers 21 and 23 not covered with the mask MSK are wholly removed in the thickness direction by dry etching such as reactive ion etching (RIE). In the dry etching, a condition in which, rather than a metal, a non-metal such as alumina is selectively removed is employed. Thus, the pedestal yoke 17 and a part of the top yoke 19 are allowed to be exposed. At the same time, the insulating layer 20 in the region not covered with the mask MSK is also removed, and thus a concave section 20U is formed in a forward section (a section contact with the pedestal yoke 17) of the insulating layer 20.

Figure 11:
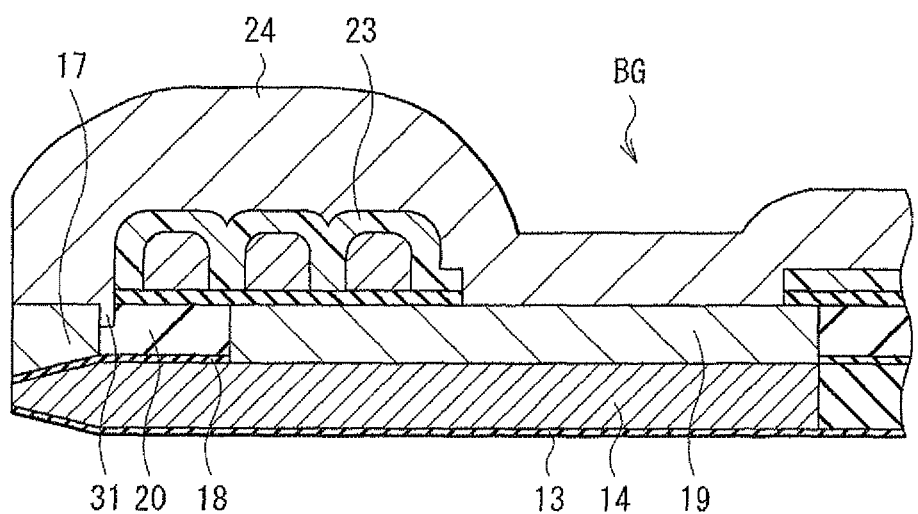
FIG. 11 is a sectional diagram for explaining a process following the process of FIG. 10.

Thereafter, as illustrated in FIG. 11, a predetermined magnetic material is so deposited as to cover the entire part so that the write shield 24 that magnetically connects the pedestal yoke 17 and the top yoke 19 is formed. At the same time, the additional magnetic layer 31 is formed by a magnetic material filling in the concave section 20U. As a result, the write head section 100B is formed.

Finally, the overcoat 25 is formed on the write head section 100B, and then the air bearing surface 220 is formed by polishing together the side surfaces of the staked body from the substrate 1 up to the overcoat 25 using the CMP or the like. Consequently, the thin film magnetic head is completed.

[Operation of Thin Film Magnetic Head]

The thin film magnetic head 212 operates as follows.

In recording data in the magnetic disk 201, first, the spindle motor 205 is driven to rotate the magnetic disk 201. The magnetic head slider 202 is accordingly floated above the surface of the magnetic disk 201. On the other hand, an external circuit (not illustrated) applies a current to the thin film coil 22 of the write head section 100B to generate magnetic flux J for recording (see FIG. 5). The magnetic flux J is taken in the main magnetic pole 14 and the top yoke 19, and then flows through the inside of the main magnetic pole 14 toward the front end section 14A. At this time, since being focused by the flare point FP, the magnetic flux J eventually converges near a trailing edge. When the magnetic flux J is emitted to the outside and recording magnetic field is accordingly generated, a hard magnetic recording layer (not illustrated) in a region supplied with the recording magnetic field in the magnetic disk 201 is magnetized. As a result, data is magnetically recorded in the magnetic disk 201.

In the thin film magnetic head 212, the current flows in the thin film coils 10 and 22 in directions opposite to each other, and therefore, the magnetic flux is generated therein in directions opposite to each other. In detail, in the thin film coil 22, the magnetic flux for recording is generated toward the leading side, whereas in the thin film coil 10, the magnetic flux for suppressing leakage is generated toward the trailing side. Accordingly, the magnetic flux for recording becomes difficult to leak to the read head section 100A, and thus the detection accuracy of the MR element 6 is prevented from lowering. In addition, the information recorded in the magnetic disk 201 is prevented from being unintentionally deleted due to the unnecessary magnetic field that is generated when the magnetic flux for recording is taken in the lower lead shield 3 and the upper lead shield 5.

In addition, when the magnetic flux J is emitted from the front end section 14A, a part (spread component) of the magnetic flux J is taken in the additional magnetic layer 31, the pedestal yoke 17, the side shields 16A and 16B, and the leading shield 8B, and thus spreading of the recording magnetic field is suppressed and the gradient of the recording magnetic field is increased. The magnetic flux J taken in the pedestal yoke 17 and the side shields 16A and 16B is resupplied to the main magnetic pole 14 through the write shield 24.

Note that the magnetic flux J emitted from the main magnetic pole 14 toward the magnetic disk 201 magnetizes the hard magnetic recording layer in the magnetic disk 201 and then returns to the write shield 24, and is resupplied to the main magnetic pole 14. Therefore, the magnetic flux J circulates between the write head section 100B and the magnetic disk 201, thereby building a magnetic circuit.

On the other hand, at the time of reproduction, when a sense current flows through the MR element 6 of the read head section 100A, the resistance value of the MR element 6 is varied depending on signal magnetic field for reproduction in the magnetic disk 201. The resistance variation is detected as voltage variation so that information recorded in the magnetic disk 201 is magnetically reproduced.

[Function and Effects of Thin Film Magnetic Head and Magnetic Recording-Reproducing Device]

In the thin film magnetic and the magnetic recording-reproducing device of the present embodiment, the additional magnetic layer 31 located behind the boundary between the pedestal yoke 17 (the first yoke) and the insulating layer 20, that is, behind the throat height zero position TP is provided. Therefore, of the magnetic flux emitted from the main magnetic pole 14 toward the magnetic disk 201, the leakage magnetic flux unnecessary for writing is absorbed by the additional magnetic layer 31. Accordingly, provision of the additional magnetic layer 31 enables reduction of the WATE effective magnetic field irrespective of the shape of the pedestal yoke 17 and the top yoke 19 (the second yoke). Consequently, according to the thin film magnetic head and the magnetic recording-reproducing device of the present embodiment, by appropriately setting the shape of the pedestal yoke 17 and the top yoke 19, the WATE effective magnetic field is reduced by the additional magnetic layer 31, while high frequency characteristics are improved. As a result, it is possible to address higher density recording.

[Modifications]

Hereinbefore, although the invention has been described with reference to an embodiment, the invention is not limited to the above-described embodiment, and various modifications may be made. For example, although the perpendicular magnetic write head of the invention is applied to the composite head, it is not necessarily limited thereto, and the perpendicular magnetic write head may be applied to a write-only head without a read head section.

Moreover, the structure (shape) of the main part of the thin film magnetic head is allowed to be variously modified. Some modifications of the thin film magnetic head of the above-described embodiment are described below.

(First and Second Modifications)

Figures 13A, 13B, 13C:
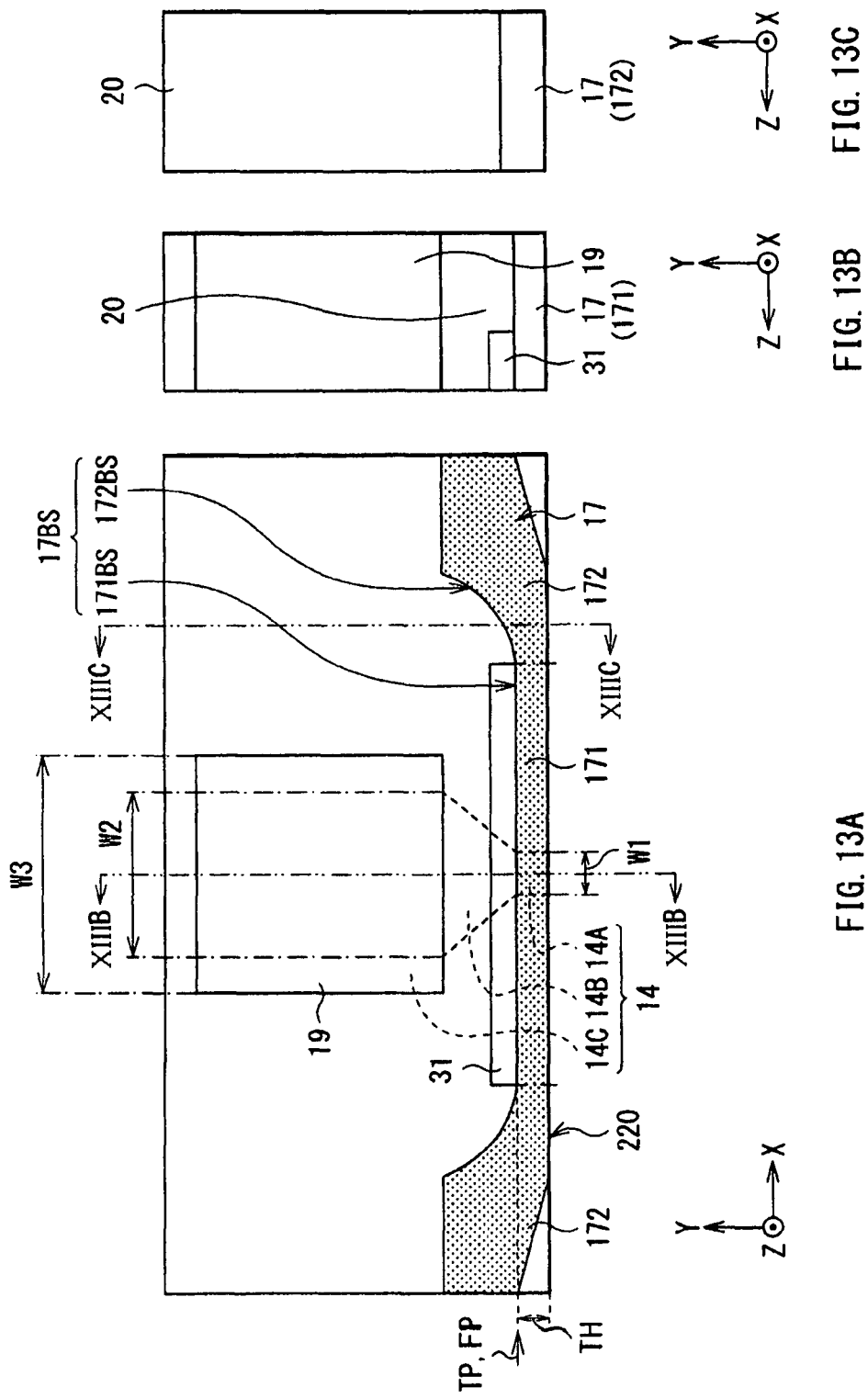
FIGS. 13A to 13C are a plan view and sectional diagrams for explaining a second modification related to a structure of a thin film magnetic head.

In the above-described embodiment, as illustrated in FIG. 4A, the additional magnetic layer 31 is provided over the entire rear end surface 17BS of the pedestal yoke 17. In contrast, in first and second modifications respectively illustrated in FIGS. 12A to 12C and FIGS. 13A to 13C, the additional magnetic layer 31 is provided along only a part of the rear end surface 17BS. For example, in the first modification (FIG. 12), although the additional magnetic layer 31 is so extended in the width direction as to be in contact with the entire of a rear end surface 171BS of a midsection 171, the ends thereof do not coincide with ends of a pair of wing sections 172 (see sections circled with a dashed line in FIG. 12A), and is provided along only a part of the rear end surface 172BS. In addition, in the second modification (FIG. 13), the additional magnetic layer 31 is so provided as to correspond to only the midsection 171. Incidentally, FIGS. 12A to 12C and FIGS. 13A to 13C are a plan view and sectional views corresponding to FIGS. 4A to 4C, respectively. Additionally, FIG. 12B and FIG. 12C illustrate cross-sectional structures taken along a XIIB-XIIB cut line and a XIIC-XIIC cut line in FIG. 12A, and FIG. 13B and FIG. 13C illustrate cross-sectional structures taken along a XIIIB-XIIIB cut line and a XIIIC-XIIIC cut line in FIG. 13A.

(Third Modification)

In the above-described embodiment, as illustrated in FIG. 4A, the additional magnetic layer 31 is an integrated layer. However, as a third modification illustrated in FIGS. 14A to 14C, the additional magnetic layer 31 may be configured of a plurality of parts. Incidentally, FIGS. 14A to 14C are a plan view and sectional views corresponding to FIGS. 4A to 4C. Additionally, FIG. 14B and FIG. 14C illustrate cross-sectional structures taken along a XIVB-XIVB cut line and a XIVC-XIVC cut line in FIG. 14A. In the present modification, the additional magnetic layer 31 is configured of a pair of additional magnetic layer patterns 31L and 31R. The additional magnetic layer patterns 31L and 31R so face each other as to be disposed on both sides of a mid region corresponding to the front end section 14A of the main magnetic pole 14 in the width direction. The pair of additional magnetic layer patterns 31L and 31R is both located behind the throat height zero position TP, and is partially in contact with the pair of wing sections 172. In addition, the pair of additional magnetic layer patterns 31L and 31R may each have a thickness smaller than that of (the midsection 171 of) the pedestal yoke 17 as illustrated in FIG. 14C, or may each have the same thickness as that of the midsection 171. In any case, the pair of additional magnetic layer patterns 31L and 31R is desirably in contact with the write shield 24 as well.

According to the present modification, since the pair of additional magnetic layer patterns 31L and 31R is provided in regions not overlapped with the main magnetic pole 14 in the thickness direction, out of the magnetic flux emitted from the main magnetic pole 14 toward the magnetic disk 201, the magnetic flux necessary for writing is surely avoided from being excessively absorbed. At the same time, the leakage magnetic flux unnecessary for writing is sufficiently absorbed by the additional magnetic layer 31.

(Fourth and Fifth Modifications)

When the additional magnetic layer 31 is configured of a plurality of parts, for example, as a fourth modification illustrated in FIGS. 15A to 15C, a plurality of additional magnetic layer patterns may be disposed in a height direction. In the present modification, a pair of additional magnetic layer patterns 31L1 and 31R1 and another pair of additional magnetic layer patterns 31L2 and 31R2 are arranged in the height direction. In this case, the additional magnetic layer patterns 31L1 and 31R1 and the additional magnetic layer patterns 31L2 and 31R2 may be the same in size in a width direction, or may be different in size in the width direction as in a fifth modification illustrated in FIGS. 16A to 16C. the additional magnetic layer patterns 31L1, 31R1, 31L2, and 31R2 are all located behind the throat height zero position TP, and are partially in contact with the pair of wing sections 172. In addition, the thickness of each of the additional magnetic layer patterns 31L1, 31R1, 31L2, and 31R2 may be smaller than that of (the midsection 171 of) the pedestal yoke 17 as illustrated in FIG. 15C and FIG. 16C, or may be equal to that of the midsection 171. In any case, the additional magnetic layer patterns 31L1, 31R1, 31L2, and 31R2 are desirably in contact with the write shield 24 as well. Incidentally, in any case, three or more pairs of additional magnetic layer patterns may be provided. Additionally FIG. 15B and FIG. 15C illustrate cross-sectional structures taken along a XVB-XVB cut line and a XVC-XVC cut line in FIG. 15A, and FIG. 16B and FIG. 16C illustrate cross-sectional structures taken along a XVIB-XVIB cut line and a XVIC-XVIC cut line in FIG. 16A.

Also in the fourth and fifth modifications, similarly to the above-described third modification, leakage magnetic flux unnecessary for wiring to the magnetic disk 201 is allowed to be sufficiently absorbed by the additional magnetic layer 31 while suppressing absorption of magnetic flux necessary for writing. In particular, in the fifth modification, the additional magnetic layer patterns 31L1, 31R1, 31L2, and 31R2 are arranged so that respective inner ends thereof are along an outer edge of the mid-section 14B. Therefore, the function of the additional magnetic layer 31 is optimized to be further exerted. In other words, in the fifth modification, unnecessary magnetic flux is more sufficiently absorbed while magnetic flux necessary for writing is more sufficiently ensured.

(Sixth Modification)

In the above-described third modification, the pair of additional magnetic layer patterns 31L and 31R configuring the additional magnetic layer 31 has a planar shape in which respective width directions are a longitudinal direction. Alternatively, as a sixth modification illustrated in FIGS. 17A to 17C, each of the additional magnetic layer patterns 31L and 31R may have a planer shape in which a height direction is a longitudinal direction. Note that FIGS. 17A to 17C are a plan view and sectional views corresponding to FIGS. 14A to 14C. Additionally, FIG. 17B and FIG. 17C illustrate cross-sectional structures taken along a XVIIB-XVIIB cut line and a SVIIC-SVIIC cut line in FIG. 17A.

(Seventh and Eighth Modifications)

Moreover, as a seventh modification illustrated in FIGS. 18A to 18C, the additional magnetic layer patterns 31L1, 31L2, 31R1, and 31R2 each having a planar shape in which a height direction is a longitudinal direction may be arranged in a width direction. In this case, as an eighth modification illustrated in FIGS. 19A to 19C, the additional magnetic layer patterns 31L1, 31L2, 31R1, and 31R2 may have different sizes in the height direction. Incidentally, in any case, three or more pairs of additional magnetic layer patterns may be provided. Additionally, FIG. 18B and FIG. 18C illustrate cross-sectional structures taken along a XVIIIB-XVIIIB cut line and a XVIIIC-XVIIIC cut line in FIG. 18A, and FIG. 19B and FIG. 19C illustrate cross-sectional structures taken along a XIXB-XIXB cut line and a XIXC-XIXC cut line in FIG. 19A.

Also in the sixth to eighth modifications, similarly to the above-described third modification, leakage magnetic flux unnecessary for writing to the magnetic disk 201 is sufficiently absorbed by the additional magnetic layer 31 while suppressing absorption of magnetic flux necessary for writing. In particular, in the eighth modification, the additional magnetic layer patterns 31L1, 31R1, 31L2, and 31R2 are disposed so that respective ends opposite from the air bearing surface 220 of the additional magnetic layer patterns 31L1, 31R1, 31L2, and 31R2 are along the outer edge of the mid-section 14B. Therefore, the function of the additional magnetic layer 31 is optimized to be further exerted. In other words, in the eighth modification, unnecessary magnetic flux is more sufficiently absorbed while magnetic flux necessary for writing is more sufficiently ensured.

(Ninth Modification)

Figure 20:
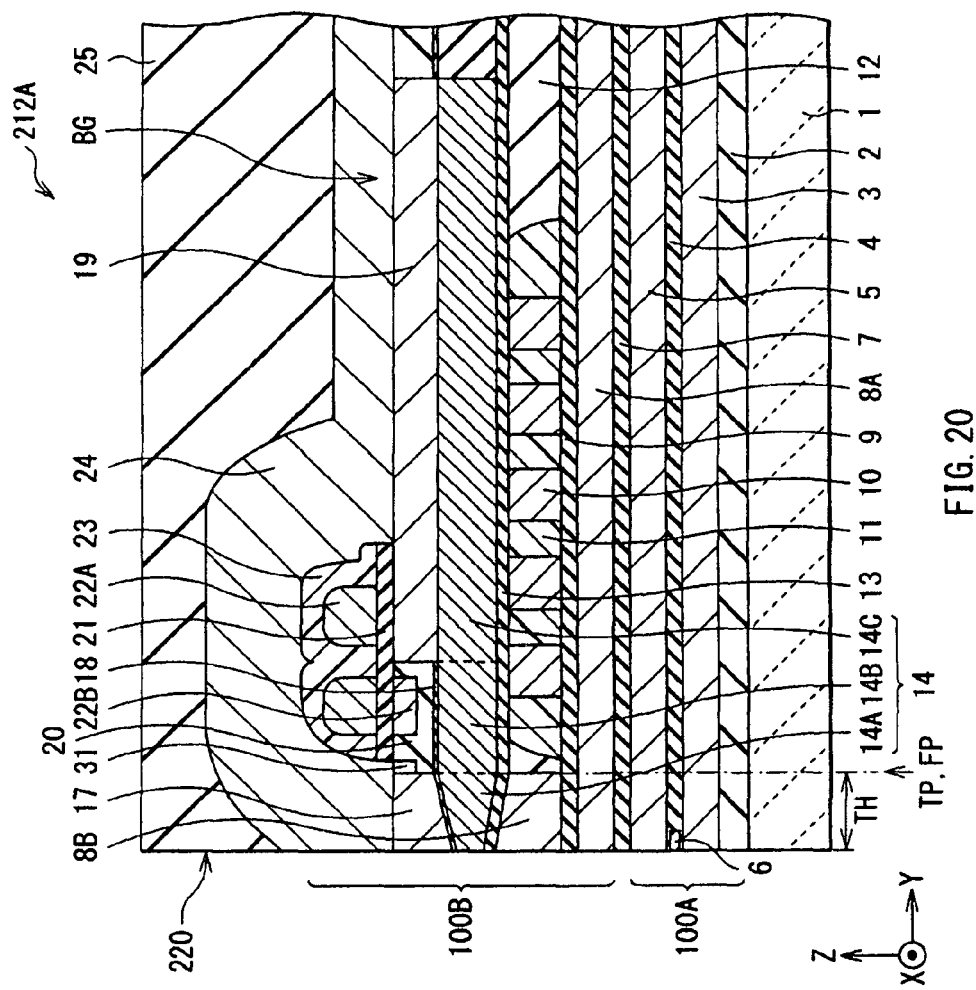
FIG. 20 is a sectional diagram for explaining a ninth modification related to a structure of a thin film magnetic head.

FIG. 20 is a sectional diagram illustrating an entire structure of a thin film magnetic head 212A as a ninth modification, and corresponds to FIG. 3B of the above-described embodiment (the thin film magnetic head 212).

In the above-described embodiment, the thin film coil 22 is provided on the same level. In the ninth modification, the thin film coil 22 is configured to include a coil section 22A provided on the insulating layer 21, and a coil section 22B that is located thereunder and is embedded in the insulating layer 20. In this way, the thin film coil 22 includes the coil section 22A and the coil section 22B that are provided on the different levels so that a length of a magnetic path is shortened while maintaining the number of entire coil turns, as compared with the thin film magnetic head 212 of the above-described embodiment.

The correspondence relationships between the reference numerals and the components of the present embodiment are collectively illustrated as follows.

1 . . . substrate, 2, 9, 11 to 13, 20, 21, 23 . . . insulating layer, 3 . . . lower lead shield, 4 . . . shield gap, 5 . . . upper lead shield, 6 . . . magneto-resistive effect (MR) element, 7 . . . separation layer, 8A . . . magnetic layer, 8B . . . leading shield, 10, 22 . . . thin film coil, 14 . . . main magnetic pole, 14A . . . front end section, 14C . . . rear end section, 15 . . . side gap (SG), 16A and 16B . . . side shields, 17 . . . pedestal yoke, 18 . . . trailing gap, 19 . . . top yoke, 24 . . . write shield, 25 . . . overcoat, 31 . . . additional magnetic layer, 100A . . . read head section, 100B . . . write head section, 200 . . . housing, 201 . . . magnetic disk, 202 . . . magnetic head slider, 203 . . . suspension, 204 . . . arm, 205 . . . spindle motor, 206 . . . drive section, 207 . . . fixed shaft, 208 . . . bearing, 211 . . . base material, 212 . . . thin film magnetic head, 220 . . . air bearing surface.

What is claimed is:

1. A perpendicular magnetic write head comprising:
a magnetic pole having an end surface exposed on an air bearing surface, and extending in a height direction perpendicular to the air bearing surface;
a first yoke having an end surface exposed on the air bearing surface, and facing a forward section of the magnetic pole with a gap layer in between;
a second yoke located behind the first yoke with an insulating layer in between in the height direction, and connected to a backward section of the magnetic pole;
a shield connecting the first yoke to the second yoke; and
an additional magnetic layer located behind a boundary between the first yoke and the insulating layer, and in contact with the first yoke, wherein the additional magnetic layer is in contact with the shield.

2. The perpendicular magnetic write head according to claim 1, wherein the additional magnetic layer has a thickness equal to or less than a thickness of the first yoke.

3. The perpendicular magnetic write head according to claim 1, wherein the first yoke has a width larger than a width of the second yoke.

4. The perpendicular magnetic write head according to claim 1, wherein
the magnetic pole includes a first magnetic pole section and a second magnetic pole section, the first magnetic pole section extending in the height direction with a uniform width, the second magnetic pole section being connected to a rear end of the first magnetic pole section and having a width gradually increasing with increase in distance from the air bearing surface, and
the additional magnetic layer extends across the second magnetic pole section in a track width direction.

5. The perpendicular magnetic write head according to claim 1, wherein
the first yoke includes a midsection and a pair of wing sections, the midsection having a rear end surface extending in a track width direction, the pair of wing sections being respectively connected to both ends of the midsection and having respective rear end surfaces curved in a direction away from the air bearing surface, and
the additional magnetic layer is continuously provided along the rear end surface of the midsection and the rear end surfaces of the pair of wing sections.

6. The perpendicular magnetic write head according to claim 1, wherein
the first yoke includes a midsection and a pair of wing sections, the midsection having a rear end surface extending in a track width direction, the pair of wing sections being respectively connected to both ends of the midsection and having respective rear end surfaces curved in a direction away from the air bearing surface, and
the additional magnetic layer is continuously provided along only the rear end surface of the midsection.

7. The perpendicular magnetic write head according to claim 1, wherein the additional magnetic layer includes a pair of magnetic layer patterns disposed on both sides of a mid region in a track width direction, the mid region corresponding to the magnetic pole.

8. The perpendicular magnetic write head according to claim 7, wherein the pair of magnetic layer patterns respectively extends in the track width direction.

9. The perpendicular magnetic write head according to claim 8, further comprising another pair of magnetic layer patterns disposed behind the pair of magnetic layer patterns.

10. The perpendicular magnetic write head according to claim 9, wherein a size of the pair of magnetic layer patterns in the track width direction is different from a size of the another pair of magnetic layer patterns in the track width direction.

11. The perpendicular magnetic write head according to claim 9, wherein a size of the pair of magnetic layer patterns in the track width direction is larger than a size of the another pair of magnetic layer patterns in the track width direction.

12. The perpendicular magnetic write head according to claim 9, wherein, in the track width direction, a distance between the pair of magnetic layer patterns is smaller than a distance between the another pair of magnetic layer patterns.

13. The perpendicular magnetic write head according to claim 7, wherein the pair of magnetic layer patterns respectively extends in the height direction.

14. The perpendicular magnetic write head according to claim 13, further comprising another pair of magnetic layer patterns respectively disposed on both sides of the pair of magnetic layer patterns in the track width direction.

15. The perpendicular magnetic write head according to claim 14, wherein a size of the another pair of magnetic layer patterns in the height direction is different from a size of the pair of magnetic layer patterns in the height direction.

16. The perpendicular magnetic write head according to claim 14, wherein a size of the another pair of magnetic layer patterns in the height direction is larger than a size of the pair of magnetic layer patterns in the height direction.

17. The perpendicular magnetic write head according to claim 1, wherein the second yoke has a rectangular planar shape.

18. A magnetic recording device including a magnetic recording medium and a perpendicular magnetic write head, the perpendicular magnetic write head comprising:
a magnetic pole having an end surface exposed on an air bearing surface, and extending in a height direction perpendicular to the air bearing surface;
a first yoke having an end surface exposed on the air bearing surface, and facing a forward section of the magnetic pole with a gap layer in between;
a second yoke located behind the first yoke with an insulating layer in between in the height direction, and connected to a backward section of the magnetic pole;
a shield connecting the first yoke to the second yoke; and
an additional magnetic layer located behind a boundary between the first yoke and the insulating layer, and in contact with the first yoke, wherein the additional magnetic layer is in contact with the shield.

* * * * *